3,565,876
ORIENTED METHACRYLONITRILE
POLYMER ARTICLES
Lawrence E. Ball, Cuyahoga Falls, Ohio, and Harry R. Musser, Rolla, Mo., assignors to The Standard Oil Company, Cleveland, Ohio, a corporation of Ohio
No Drawing. Filed Feb. 28, 1968, Ser. No. 708,814
Int. Cl. C08f 15/22
U.S. Cl. 260—85.5                                    4 Claims

ABSTRACT OF THE DISCLOSURE

Multiaxially oriented articles or films which have superior physical properties and are heat shrinkable and heat sealable can be prepared by extrusion from polymers or copolymers of methacrylonitrile with acrylonitrile in the ratios of 80 to 100 parts by weight of methacrylonitrile to 20 to 0 parts by weight of acrylonitrile and optionally up to about 5 parts by weight of the methacrylonitrile may be replaced by another vinyl monomer such as methyl methacrylate.

---

This invention relates to oriented articles composed of resinous methacrylonitrile polymers and more particularly, to multiaxially oriented articles and particularly multiaxially oriented films of polymethacrylonitrile and copolymers of methacrylonitrile and acrylonitrile.

Heretofore, biaxially oriented films of high acrylonitrile polymers, as described in the copending application of Lawrence E. Ball, Ser. No. 421,612, filed Dec. 28, 1964, now Pat. No. 3,418,406, were prepared by solvent casting of film and subsequent two-way stretching and heat setting of the solvent-containing cast film.

It has now been discovered that a multiaxially oriented article or film processable by extrusion can be prepared from polymers resulting from the polymerization of methacrylonitrile optionally with acrylonitrile wherein the two nitriles are combined in the ratios of 80 to 100 parts by weight of methacrylonitrile to 20 to 0 parts by weight of acrylonitrile. The films of the present invention are heat shrinkable and heat sealable, and the various other physical properties such as tensile strength, yield strength, and gas and vapor barrier properties are enhanced while the desirable thermoplastic properties of the polymethacrylonitrile resin such as melt stability are still retained.

One of the outstanding features of the resins embodied in this invention is that they are processable by extrusion and they are easier to orient than prior art polymers composed primarily or wholly of acrylonitrile. It is known that polymers containing more than 50 percent by weight of polymerized acrylonitrile cannot be extruded by usual techniques. Polyacrylonitrile, for instance, must be used in conjunction with a solvent or plasticizer for shaping and orientation. We have discovered that up to about 20 percent by weight of acrylonitrile can be copolymerized with methacrylonitrile to form extrudable copolymers which can be readily oriented and posses excellent physical properties. Increasing the acrylonitrile content above 20 percent by weight in acrylonitrile-methacrylonitrile copolymers results in a resin which is unstable in the melt, and the resin per se is not processable by any of the usual commercial techniques known today, including extrusion.

The improved multiaxially oriented articles of this invention can be prepared by employing polymers falling within certain molecular weight ranges, and by employing certain processing techniques to be more fully described. Oriented films and other oriented articles having outstanding physical and chemical properties can be prepared from resinous methacrylonitrile homopolymers and copolymers of methacrylonitrile with acrylonitrile having a minimum apparent weight average molecular weight of about 50,000, as determined by gel permeation chromatography. Polymer articles, particularly film, can be prepared by extrusion followed by stretching in a single direction, in both a longitudinal and transverse direction (substantially at right angles to the longitudinal stretch direction) or in a radial direction. The articles of this invention are preferably multiaxially oriented which means that they are stretched in more than one direction.

It is also contemplated to be within the scope of this invention to replace up to about 5 percent by weight of the methacrylonitrile in the polymers embodied herein with one or more polymerizable nonnitrile-containing vinyl monomers such as those known for imparting dyability to nitrile fiber polymers. Polymerizable mono-alkenyl monomers useful in this invention for the replacement of up to about 5 percent by weight of methacrylonitrile include the acrylate esters such as methyl acrylate, ethyl acrylate, the propyl acrylates, the butyl acrylates, the amyl acrylates, the hexyl acrylates, cyclohexyl acrylate, phenyl acrylate, the octyl acrylates and the like; the methacrylate esters such as methyl methacrylate, ethyl methacrylate, propyl methacrylate, the butyl methacrylates, the amyl methacrylates, the hexyl methacrylates, cyclohexyl methacrylate, phenyl methacrylate, the decyl methacrylates and the like; vinyl esters such as vinyl acetate, vinyl propionate, the vinyl butyrates, vinyl benzoate, isopropenyl acetate and the like; the vinyl aromatics such as styrene, alpha-methyl styrene, vinyl toluene, the vinyl xylenes, the vinyl naphthalenes, isopropenyl benzene and the like; vinyl amides such as acrylamide, methacrylamide, N-methyl acrylamide, vinyl benzamide, N-vinyl pyrrolidone, and the like; the vinyl halides such as vinyl chloride, vinyl bromide, vinyl fluoride, vinylidene chloride, vinylidene fluoride, dichloro-difluoro-ethylene, tetrafluoroethylene and the like; olefins such as ethylene, propylene, isobutylene, butene-1, and the like. More preferred for use in this invention are the acrylic or methacrylic esters, and most preferred is methyl methacrylate.

The film-forming polymers useful herein may be prepared in any convenient manner such as batch, bulk, solution, emulsion, or suspension polymerization techniques, all of which are well known in the art. For best results, however, it is preferred that the polymer be prepared in an aqueous medium in the presence of a catalyst composed of a water-soluble persulfate, as for example, potassium persulfate, a peroxygen compound such as t-butyl peroxypivalate or an azo compound such as azo-bis-isobutyronitrile at a temperature in the range of 32° to about 212° F.

The polymerization reaction may be carried out by adding all of the monomer to the reaction mixture at once or in increments or in a continuous manner during the course of the reaction. A suitable emulsifier, surface active agent or dispersing agent may be used throughout the polymerization procedure.

In a representative polymerization procedure which is not meant to limit the scope of this invention, an aqueous medium containing about 0.1 to 10 percent by weight, based on the monomer, of a suitable emulsifier or dispersing agent, about 0.01 to 5 percent by weight of a molecular weight modifier, 0.01 to 5 percent by weight of an initiator, and the monomer are placed in an appropriate vessel which is provided with a means of agitation, such as stirring or shaking. The air in the free space of the vessel is displaced by an inert gas such as nitrogen. The mixture is heated to a temperature preferably in the range of 85° to 210° F. with continuous or intermittent agitation until polymerization has proceeded to the desired extent (usually 70 to 100 percent conversion). At the conclusion of the polymerization, the polymer useful in this invention may be isolated as a finely divided powder by a variety of methods. For example, a dispersion may be sprayed into a heated and/or evacuated chamber whereby the water is removed as vapor and the polymer falls to the bottom of the chamber. When the polymer is prepared in sufficiently high solids, that is 15 percent or higher, it often can be isolated into granular powder simply by filtration or centrifugation. If emulsion polymerization is used, the latex is coagulated, as for example, by means of an alcoholic solution of hydrated aluminum sulfate, before filtration. This step is not essential with suspension polymerization techniques. The polymer may also be isolated by cooling the dispersion below the freezing point of the aqueous medium or by the addition of a large volume of a lower aliphatic alcohol such as methanol or ethanol. A satisfactory procedure consists of adding an appropriate amount of an electrolyte solution to the dilute aqueous dispersion with rapid agitation and at a temperature just below the point at which the precipitated particles tend to adhere. This procedure yields a polymer in a form of dense granular particles which are readily filtered and washed. Suitable electrolytes include sodium chloride, sodium sulfate, hydrochloric acid, phosphoric acid, calcium chloride, magnesium sulfate, lead nitrate, lead acetate, stannous chloride and aluminum sulfate. After precipitation the polymer is filtered and washed repeatedly with water to remove traces of electrolyte and dispersing agent which may adhere to the particles. Washing with dilute solutions of caustic soda or ammonium hydroxide assists in removing the last traces of dispersing agent, and at the same time yields polymers of improved heat stability. It is also beneficial to employ a final wash of lower aliphatic alcohol such as methanol or ethanol to remove any residual soap or water.

If desirable, lubricants, dyes, bleaching agents, plasticizers or psuedo plasticizers, pigments, and antistatic agents may be incorporated into a polymer of this invention or the final films or shaped articles prepared therefrom may be after-treated with agents of these types.

The films of this invention may be prepared by solvent casting or preferably by a thermoforming procedure such as extrusion, compression molding or calendering, however, for economic reasons and for ease in processing it is most preferred that they be extruded. The polymers may be extruded from any conventional type extruder at a temperature of about 300° to 450° F. For example, a screw-type extruder employing an annular die to form thin walled polymer cylinder or a sheet die forming a continuous sheet may be used. Because the methacrylonitrile homopolymer and the copolymers of methacrylonitrile and acrylonitrile are thermoplastic, they can be oriented as a solvent-free plasticized material. The presence of any solvent makes orientation difficult and the properties inferior to those obtained under similar conditions with solvent-free material.

Orientation of the polymer articles described herein may be accomplished by a number of techniques well known in the art. For example, the polymer film may be oriented in a longitudinal direction by passing continuously to a drafter or similar device. The drafter may be a conventional four-roll apparatus having two hot rolls and two cold rolls, one pair being slow moving, which may be heated to the desired drawing temperature and the other pair being fast rolls. The two pairs or series of rolls are closely spaced so that the film is supported on the rolls over most of the region in which it is subjected to tension, and transverse shrinking is reduced to a minimum.

Biaxial or multiaxial orientation of the film may be accomplished by tentering, bubble, octagonal stretching or horseshoe mandrel processes. Although the examples of polymers of methacrylonitrile and copolymers with acrylonitrile given in Tables I and II were blow oriented by means of a bubble process, this is not meant that the orientation procedure should be limited to this process.

In the orientation step, the temperatures employed should be in the range from 250° to 325° F. Attempts to orient polymer articles of this invention at temperatures much below 250° F. usually fail because the resin does not draw properly or expand sufficiently, and orientation of the article at temperatures much in excess of 325° F. is not effective because the polymer relaxes rapidly and orientation is not retained. It is desirable that the stretch ratio of the article or film be in the range from about 1.2 up to about 10 times the original length in each direction of stretching.

In a representative procedure for the multiaxial orientation of a film by the instant process a stream of molten polymer at about 400° F. is forced at a uniform rate through a rotary cooler by means of a gear pump. The exit temperature is about 340° to 400° F. The polymer is then extruded through a tube die and the tube is expanded around an air bubble to introduce simultaneous biaxial drawing. At the same time, the draw rolls pull the film away at a linear rate greater than the rate of tube extrusion at the die, introducing orientation in the machine direction. If more air is added to the bubble, its diameter increases. As the hot extruded tube is expanding and accelerating downward, it is also cooling. When the thin film reaches 250° to 325° F. its ability to flow or expand further is drastically reduced and its tensile strength increases sharply. Thus a falling temperature gradient during biaxial orientation is essential for successful air bubble processing. A guide ring keeps the bubble centered, and by rapidly cooling the surface of the tube provides a hardened skin which further stabilizes the bubble from random motion and promotes more uniform thickness in the film.

The orientation films obtained by this process are shrinkable in all directions when they are heated. The films of this invention are heat sealable, and they are outstanding barriers for various gases and vapors. They have excellent resistance to attack by most chemicals, excellent resistance to degradation by ultra-violet radiation, and they have excellent mechanical and flex strengths. These and other desirable properties make the films of this invention particularly useful in a wide variety of applications, as for example, in packaging, particularly where heat shrinkable and heat sealable films are required, magnetic tape, surfacing and laminating, decorative trim on automobiles, pressure sensitive tapes, glazing and the like. The ultimate film properties can be tailored within certain limits through slight variations in the conditions of the orientation procedure.

EXAMPLES

The homopolymer of methacrylonitrile was prepared by means of emulsion polymerization according to the following procedure:

(A) To a 20-gallon reactor containing 8.47 gallons of deionized water, was added 1.27 pounds of an emulsifier GAFAC RE610 [1] predissolved in one gallon of water. The pH of the solution was adjusted to 6.5 with NaOH. The reactor was purged with nitrogen and the solution was heated under an inert atmosphere to 165° F. for 15 minutes then cooled to 140° F. To the heated mixture were added 6.32 gallons of methacrylonitrile and 0.335 pound of the molecular weight modifier, n-dodecylmercaptan, while maintaining the nitrogen purge. 0.127 pound of the initiator, Lupersol-11 (t-butylperoxypivalate) was then added and the polymerization reaction was allowed to continue for 18 hours. The product was then cooled

---

[1] A mixture of $R-O-(CH_2CH_2O-)_nPO_3M_2$ and
$[R-O-(CH_2CH_2O-)_n]_2PO_2M$ wherein $n$ is a number of from 1 to 40, R is an alkyl or alkaryl group and preferably a nonyl phenyl group and M is hydrogen, ammonia or an alkali metal which composition is sold by the General Aniline and Film Corporation.

to a temperature of about 120° F. and filtered through cheese cloth to remove any prefloc. The latex was coagulated by the addition of methyl alcohol (containing 15 cc. per gallon of saturated aluminum sulfate solution) in amounts of two gallons per gallon of latex. The polymer was then filtered, and washed with methyl alcohol and dried in a vacuum oven at a temperature of 120° F. The product obtained had an apparent molecular weight of 148,000, as determined by gel permeation chromatography measurements in dimethyl formamide. In a similar fashion copolymers were prepared employing the following monomer weight ratios:

(B) 95 parts methacrylonitrile-5 parts acrylonitrile.
(C) 90 parts methacrylonitrile-10 parts acrylonitrile.
(D) 85 parts methacrylonitrile-15 parts acrylonitrile.
(E) 80 parts methacrylonitrile-20 parts acrylonitrile.
(F) 70 parts methacrylonitrile-30 parts acrylontrile.
(G) 60 parts methacrylonitrile-40 parts acrylonitrile.
(H) 95 parts methacrylonitrile-5 parts methyl methacrylate.

In the preparation of polymers (B) through (H) n-octyl mercaptan was substituted for n-dodecylmercaptan as the molecular weight modifier. Polymers (F) and (G) are outside the scope of the instant invention.

Copolymers (B), (C), (D), (F), (G), and (H) each had a molecular weight in excess of 50,000.

The copolymer (E) had an apparent molecular weight of 120,000, and the copolymer (H) had an apparent molecular weight of 95,300.

Pellets of the dried polymers (A) through (H) were extruded and blow oriented on a small laboratory unit. The extruder had a small, one-inch, single-phase screw with a length/depth ratio of 10/1. The screw had a 2.2:1 compression ratio, a 0.075 inch deep meter and a revolving speed of 45 r.p.m. The diameter of the annular die was 0.678 inch and blown film was obtained up to a diameter of 8.5 inches. A temperature of 400° F. was used with an air ring around the die to cool the film as it was extruded and blown. Radial draws of up to 8.2 were achieved. The take-off speed ranged from 17 to 24 feet per minute, and the film thickness varied between 0.5 to 1.5 mils.

The properties of the films prepared in accordance with the above procedures from polymers (A) through (H) are summarized in Tables I and II. Table I illustrates tensile strength, yield strength, percent elongation, barrier properties, heat shrink tension an heat sealability of multiaxially oriented films of polymers (A), (E) and (H).

The heat shrink measurements were made according to the ASTM test procedure D 1504-61. Generally, the method consists of measuring the maximum load exerted by a restrained thermoplastic sheet while being heated to the temperature at which the stress was introduced in processing. The stress is calculated from the minimum initial cross-sectional area of the sample.

Heat sealability was determined by placing two sheets of film between a pair of polytetrafluoroethylene bars, one of which was heated. The film was subjected to a pressure of 40 p.s.i. between the bars for a period of one and one-half seconds while the temperature of the bar was increased until the two sheets of film adhered.

The melt instability of copolymers containing more than 20 percent acrylonitrile is shown by the Brabender torque measurements of polymers (A), (E), (F), and (G) in Table II. These measurements represent the amount of energy required to cause the polymer to flow in bulk. Measurements were made at a temperature of 400° F. and at 35 r.p.m. The desired effect is to obtain a low torque value with little change in torque with time. The data show that the copolymers containing 30 percent or more acrylonitrile have a much higher torque value and much greater change in torque with time.

Attempts were made to extrude polymers (F) and (G) by feeding a powdered form of these polymers to a small screw-driven extruder equipped with a strand-forming die at a temperature of 375° F. On attempting to extrude these materials the polymers became discolored and very viscous so that they no longer had the properties of a thermoplastic material. The polymers then degraded further giving off gases and eventually turning into black sandy substances which were no longer processable.

Polymer (E) was extruded and blow oriented on the same laboratory unit and under the same conditions as previously described with the exception that the air ring to cool the film was not in operation. The film therefore was oriented at a temperature considerably above 325° F., with the result that the final film obtained was unoriented even through the film had been blown.

TABLE I

|  | (A) | (E) | (H) |
| --- | --- | --- | --- |
|  | 100 MAN [1] | 80 MAN-20 AN [1] | 95 MAN-5 MMA [1] |
| Tensile strength×10⁻³ p.s.i. (MACH. DIR.) | 20.5 | 32.4 | 30.6 |
| Yield strength×10⁻³ p.s.i. (MACH. DIR.) | 13.6 | 25.4 | 26.1 |
| Elongation percent at break (MACH. DIR.) | 64.0 | 40.8 | 69.9 |
| Tensile strength×10⁻³ p.s.i. (TRANS. DIR.) | 16.1 | 22.4 | 23.6 |
| Yield strength×10⁻³ p.s.i. (TRANS. DIR.) | 15.6 | 23.3 | 21.6 |
| Elongation percent at break (TRANS. DIR.) | 45.8 | 55.8 | 53.4 |
| Oxygen transmission rate (cc.-mil/100 in.²/24 hr./atm.) | 0.195 | .045 | 0.11 |
| Water vapor transmission rate (g.-mil/24 hr./100 in.²) | 1.64 | 1.63 | 1.87 |
| Heat shrink tension (lbs./sq. in.) | 755 M.D.; 132 T.D. | 531 M.D.; 143 T.D. | 575 M.D.; 120 T.D. |
| Heat seal temperature (° F.) | 250 | 300 | 250 |

[1] Ratio by weight of monomers employed in the polymerization reaction.

TABLE II.—BRABENDER TORQUE MEASUREMENTS

|  | Torque, m./gms. | Percent change in torque |
| --- | --- | --- |
| Time | 3 minutes | 24 minutes |
| (A) 100 MAN [1] | 2,760 | 27.5 |
| (E) 80 MAN-20 AN [1] | 3,450 | 30.5 |
| (F) 70 MAN-30 AN [1] | 3,650 | 38.5 |
| (G) 60 MAN-40 AN [1] | 4,200 | 61.0 |

[1] Weight ratio of monomers employed in the polymerization reaction.

We claim:
1. The process for preparing a heat shrinkable, heat sealable multiaxially oriented article comprising extruding at a temperature of about 300° to 450° F. a viscous polymer resulting from the polymerization in the presence of a free-radical initiator of a mixture of 80 to 100 parts by weight of methacrylonitrile, 0 to 20 parts by weight of acrylonitrile and 0 to 5 parts by weight of another vinyl monomer copolymerizable with methacrylonitrile, and stretching the extrudate in more than one direction.

2. The process of claim 1 wherein the polymer is one resulting from the polymerization of a mixture of 80 parts by weight of methacrylonitrile and 20 parts by weight of acrylonitrile.

3. The process of claim 1 wherein the polymer is one resulting from the polymerization of a mixture of 95 parts by weight of methacrylonitrile and 5 parts by weight of methyl methacrylate.

4. The process of claim 1 wherein the polymer is one resulting from the polymerization of a mixture of 95 parts by weight of methacrylonitrile and 5 parts by weight of acrylonitrile.

References Cited

UNITED STATES PATENTS

| | | | |
|---|---|---|---|
| 3,056,676 | 10/1962 | Hendricks | 260—88.7 |
| 3,110,548 | 11/1963 | Fukushima et al. | 260—88.7 |
| 3,275,612 | 9/1966 | Bechtold | 260—88.7 |
| 3,418,406 | 12/1968 | Ball | 264—206 |

HARRY WONG, JR., Primary Examiner

U.S. Cl. X.R.

117—132; 161—247; 260—29.6, 80.6, 88.7; 264—206